June 10, 1930.  S. T. EDWARDS  1,763,139
MEASURING FEEDER
Filed Aug. 12, 1929  2 Sheets-Sheet 1
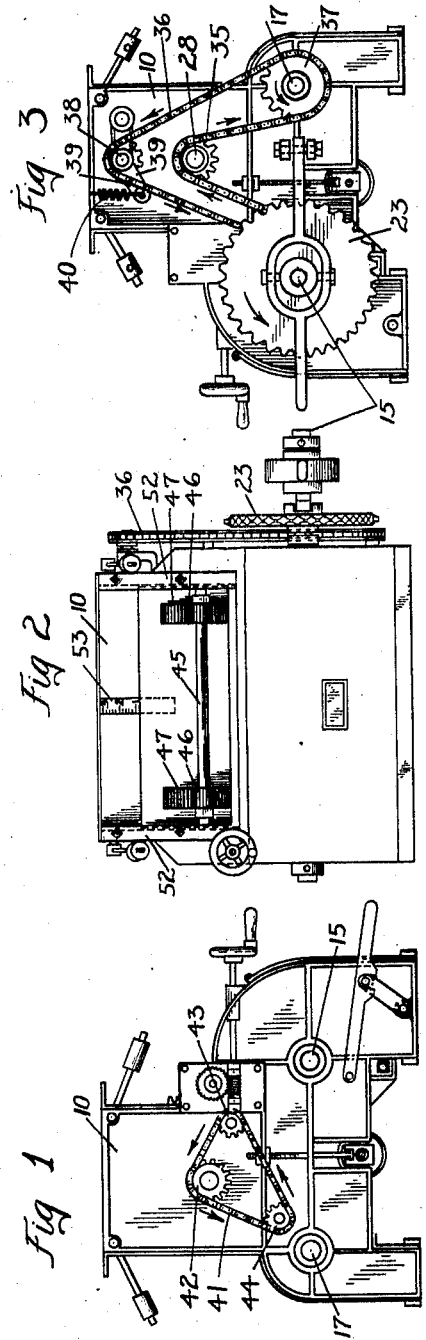
Inventor:
Sherman T. Edwards
By: Byrenforth Lee Critton & Wiles
Attys June 10, 1930.  S. T. EDWARDS  1,763,139
MEASURING FEEDER
Filed Aug. 12, 1929   2 Sheets-Sheet 2

Fig 4

Inventor:
Sherman T. Edwards
By Byrnforth Lee Critton & Wiles
Att'ys.

Patented June 10, 1930

1,763,139

UNITED STATES PATENT OFFICE

SHERMAN T. EDWARDS, OF CHICAGO, ILLINOIS

MEASURING FEEDER

Application filed August 12, 1929. Serial No. 385,121.

This invention relates to improvements in measuring feeders and, more especially, such a device adapted for feeding granular material at a predetermined rate.

My improved feeder is particularly suited, for example, for accurately measuring finely ground products in the mixing of mash and dairy feeds.

My improved feeder is of the belt type equipped with a lump breaker and improved agitating device, so that the discharge is even, uniform; and visible to the operator.

The feeder is also equipped with a dust damper and signal device indicating when the bin is empty.

Other features and advantages of my improved feeder will appear more fully as I proceed with my specification.

In that form of device embodying the features of my invention shown in the accompanying drawings—

Figure 1 is a general view in side elevation; Fig. 2 is a view in front elevation; Fig. 3 is a view in side elevation; and Fig. 4 is a view similar to Fig. 1 showing more detail, and partly in section.

As shown in the drawings, the feeder includes a receiving hopper 10 adapted to receive material from a bin (not shown) above. Pivotally mounted on opposite edges at the top of the hopper are two gates 11, 11 counterbalanced by the weights 12, 12. The weights 12, 12 are sufficiently light so that material normally flowing into the hopper will impinge upon the gates and hold them open. In the event of failure of the supply, the gates are lifted by the counter weights, and the consequent downward movement of said weights, being visible to the operator, at once indicates the failure of the supply.

The bottom of the hopper 10 is closed by the upper reach or strand 13ª of an endless belt conveyor 13 moving in the direction indicated by the arrows. This conveyor is carried by a driving drum or roller 14 on the shaft 15 and a supporting drum or roller 16 on the shaft 17. Numeral 18 indicates a tension roller under the belt conveyor. Screw means 20 attached to the vertically slidable blocks 21 carrying the shaft 22 on which the roller 18 is mounted provide means for vertically adjusting this roller to give the belt the desired tension.

The shaft 15 is driven by the sprocket wheel 23 mounted thereon and the sprocket wheel may be rotated from any source of power, for example, a chain 24 driven by a smaller sprocket 25 on the power shaft 26.

Transversely and rotatably mounted in the hopper 10 is a lump breaker and agitator comprising a drum or roller 27 mounted on the shaft 28 and provided with radial spokes or breaker bars 29.

Numeral 30 indicates a rotatable brush mounted on the shaft 31 located beneath the conveyor belt, for the purpose of cleaning the same.

Numeral 32 indicates a square bar rotatably mounted on the inside and near the lower edge of a slidable gate 33 forming the front wall of the hopper. The bar 32 is provided with four tangentially arranged wings 34 having their outer edges curved or bent over, as indicated by 34ª. This bar with its wings lies just over and adjacent the discharge outlet of the machine and is rotated in the direction indicated by the arrows. This mechanism serves to smooth or level the material on the belt conveyor as it issues from the machine and thus serves to cause a more uniform and accurate flow.

The shaft 28 carrying the agitator is provided with a sprocket wheel 35 driven by a chain 36 which, in turn, is driven by a sprocket wheel 37 on the shaft 17. The chain 36 also passes over a tension idler sprocket wheel 38 rotatably mounted on a pivoted arm 39 controlled by a spring 40 to give the chain the desired tension. This chain also passes over a sprocket wheel (not shown) mounted on the shaft 31 and serves to drive the brush 30.

Numeral 41 indicates a chain passing over a sprocket wheel 42 on the shaft 28 and driven therefrom. This chain passes over a sprocket wheel 43 mounted on the end of the square bar 32 and serves to rotate the same in the direction indicated by the arrows. Numeral 44 indicates an idler sprocket wheel for the chain 41. It is to be understood that portions of the bar 32 near the ends thereof are rounded and carried in suitable bearings.

Means are provided for raising and lowering the sliding gate 33 to regulate the rate of feed of the machine. Said means include a transversely arranged rotatable shaft 45 at the front of the machine carrying two pinions 46, 46 meshing with racks 47, 47 on the gate. The shaft 45 also carries a worm wheel 48 meshing with a worm 49 on the shaft 50 adapted to be rotated by the operating handle 51. The worm wheel device permits accurate and fine manipulation of the gate and being irreversible, the gate will always remain in its adjusted position. The provision of two rack bars 47, 47 on opposite sides of the gate also insures its free movement in the guides 52, 52 without binding. A calibrated scale 53 may be provided to indicate the adjustment of the gate.

Material is adapted to issue from the machine through the discharge mouth 54 on the lower end of the discharge chute 54ª. Numeral 55 indicates a baffle or deflector plate swingably mounted on the chute below the belt conveyor to deflect material falling from the conveyor and cause the same to issue through the mouth opening at the bottom. The top of the plate is adapted to be swung forwardly to close the mouth if desired and in such case, any material falling from the conveyor is deflected rearwardly away from the mouth opening. The swinging mounting of the plate 55 is accomplished by attaching the lower edge of the same to the rockable shaft 56 which carries an arm 57 provided with a pin 58 embraced by a notch 59 in the adjusting lever 60. The latter carries on its outer end a suitable handle 61 and has its inner end pivotally mounted on the upper end of the link 62, the lower end of the latter being pivotally mounted, as indicated by 63, in the bearing 64.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I regard as new, and desire to secure by Letters Patent, is:

1. A device of the character described, including; a hopper; a belt conveyor across the bottom of the hopper; a vertically slidable gate above the conveyor at the side of the hopper adjacent the discharge end of said conveyor; and a rotatable material leveling member carried on the inner side of the gate near its lower edge.

2. A device as claimed in claim 1, in which the material leveling member includes a rotatable shaft equipped with projecting wings.

3. A device as claimed in claim 1, in which the material leveling member includes a rotatable shaft equipped with projecting wings having curved edges.

4. A device as claimed in claim 1, with a discharge chute below and adjacent the discharge end of the conveyor and a swingable baffle member adapted to deflect material falling from the conveyor into said chute.

In witness whereof, I have hereunto set my hand and seal this 9th day of August, 1929.

SHERMAN T. EDWARDS.